3,359,167
VITAMIN A COMPOSITIONS
Albert E. Timreck, Rego Park, N.Y., assignor to Chas. Pfizer & Co., Inc., New York, N.Y., a corporation of Delaware
No Drawing. Filed July 22, 1965, Ser. No. 474,184
9 Claims. (Cl. 167—81)

The present application is a continuation-in-part of co-pending U.S. patent application Ser. No. 183,747, filed Mar. 30, 1962, and now abandoned.

This invention relates to certain novel vitamin A compositions and more particularly, to non-aqueous, stable, readily water-dispersible vitamin A fatty acid ester compositions which contain more than one dispersing agent therein.

In general, the pharmaceutical art has long been concerned with the problem of finding a suitable way to render lipoid-soluble vitamins dispersible in aqueous media. For instance, although vitamin A palmitate of commerce is soluble in most common organic solvents and readily miscible in all proportions with ordinary mineral and vegetable oils, it is insoluble in water, thereby necessitating the use of an emulsifier or dispersing agent in this connection, i.e., when aqueous systems are desired. Since then, it has been found possible by other workers in the field to prepare clear aqueous dispersions of said vitamin in concentrations of up to about 100,000 U.S.P. units per gram by using polyoxyethylene derivatives of certain high molecular weight fatty acid esters such as the sorbitan fatty acid ester derivatives, for example, which act as dispersing agents for this purpose. Although this represented a great advance in the art at the time, the relatively long period required in order to effect said dispersion still remained a problem, which, in turn, necessitated special handling, etc. (e.g., the use of elevated temperatures, and the like).

It is, therefore, a primary object of the present invention to provide a non-aqueous, but yet rapidly water-dispersible vitamin A fatty acid ester composition of high potency which will, at the same time, remain stable under normal or ordinary conditions of use. Other objects and advantages of the present invention will be apparent to those skilled in the art from the description which follows herein.

In accordance with the present invention, the foregoing objects have now all been achieved by the rather surprising discovery that vitamin A fatty acid esters can be rapidly dispersed in water when first admixed with a non-aqueous combination comprising (1) a polyoxyethylene derivative of a monoester of sorbitan with a higher fatty acid having from 16 to 18 carbon atoms and (2) a lower polyethylene glycol having an average molecular weight that is in the range of from about 200 up to about 600, the vitamin A ester being present in said composition at a level ranging from about 3% to about 15% by weight of the total and the ratio by weight of (1) to (2) being from about 4:3 up to about 9:1 when said vitamin A concentration is below 10% and from about 4:3 to about 5:1 when said vitamin A concentration is at least about 10%. The advantages afforded by the compositions of the invention are manifold: for instance, (a) they are rapidly dispersed in water, as aforesaid, in a matter of seconds to give clear, stable solutions of vitamin A of high potency; (b) the component ingredients are all safe and effective for human use and (c) the compositions themselves find further application in the form of soft gelatin capsules, multivitaminaceous aqueous dispersions and/or other liquid vitamin preparations, such as syrups, elixirs, and the like, in combination with the water-soluble vitamins.

In connection with a more detailed consideration of this invention, the vitamin A component of the present compositions may be any vitamin A higher fatty acid ester such as one having at least eight carbon atoms in the acyl moiety of the ester grouping. Preferred esters for these purposes include pure vitamin A palmitate, vitamin A corn oil fatty acid esters and vitamin A coconut oil fatty acid esters. As previously indicated, the ester component is generally present in said compositions at a concentration level of up to about 15% by weight of the total. A preferred range in this respect would be from between about 3% and about 10% by weight of the total, for example. Needless to say, there is no real lower limit to the minimum concentration of vitamin A that can be incorporated into these compositions, but it should be noted that concentrations of less than about 3% by weight are of little practical value.

The polyoxyethylene derivative of the sorbitan monoester of this combination is desirably a polyethylene oxide derivative of such sorbitan fatty acid esters as sorbitan monopalmitate, sorbitan mono-oleate, sorbitan monostearate, etc. These compounds are all available commercially under various trademark names (e.g., the "Tween" trademark name of the Atlas Powder Company) and will hereinafter be referred to as polysorbates throughout the remainder of this specification for the sake of convenience. For instance, polysorbate 60 is a polyoxyethylene sorbitan monostearate having approximately twenty oxyethylene units per molecule, while polysorbate 80 is the corresponding mono-oleate and polysorbate 40, the corresponding monopalmitate. The polysorbate components so described can be present in said compositions at concentration levels ranging as high as 85% by weight of the total, although they are ordinarily used within the aforestated weight ratio range of about 4:3 to about 9:1, with respect to the glycol component, when dealing with a vitamin A fatty acid ester concentration of up to about 10% by weight of the total and from about 4:3 to about 5:1 when said vitamin A concentration is at least about 10% by weight of the total but not more than about 15%.

The third principal component of these compositions, viz., the polyethylene glycol of average molecular weight 200–600, is generally present to the extent that it is no more than 50% by weight of the total and at such a level that it falls within the above indicated weight ratio range. It is the last named component of the mixture that actually renders the present compositions far more water-dispersible than those containing the aforementioned polysorbates alone as the sole dispersing agents for this purpose. The particular polyethylene glycols used in this invention are more correctly called "polyoxyethylene glycols," and are also known under the trademark name of "Carbowax" (Union Carbide Corporation), where the numerical suffix designation after their name roughly corresponds to the approximate molecular weight of the compound, e.g., Carbowax 400 is a polyoxyethylene glycol of average molecular weight 400, and so on. However, for the sake of convenience, the generic term "polyethylene glycol" will be used for these compounds throughout the remainder of the specification in place of either Carbowax or polyoxyethylene glycol.

In accordance with the process employed for preparing these compositions, the polysorbate or polyoxyethylene-sorbitan monoester component and the polyethylene glycol are first blended together by means of stirring. When they are intimately mixed, the vitamin A component is next added to the combination and the constituents are then mixed again until a clear, uniform preparation is produced. Care must be taken during the course of this operation to ensure that aeration of the mixture does not occur as this will tend to have a deleterious effect upon the vitamin A component caused by oxidative degradation of the same. Upon completion of this step, conventional sweetening and flavoring agents, as well as preservatives like methyl and propyl paraben, can be added to the mixture at this point to afford the desired product in finished dosage form. The clear uniform mixture prepared in this manner can be utilized as the source of vitamin A, together with other oil-soluble vitamins, in finished dosage forms. For instance, the rapidly dispersing composition can be easily and quickly added to aqueous multivitamin preparations, for example, without both heating the aqueous portion and the vitamin A-dispersing agent portion prior to the careful mixing of the two to form a dispersion. The elimination of the heating step in this connection, in turn, permits the use of simpler, still less expensive equipment, and saves both time and money, particularly as to labor costs. The rapidly dispersing composition may also be used in soft gelatin capsules of water-soluble vitamin A, if so desired.

The compositions prepared according to the present invention have all been found to be stable (as regards potency) for periods of up to twelve weeks at temperatures ranging as high as 37–45° C., as well as for periods of up to 26 weeks when tested at room temperature. Furthermore, stability testing in aqueous dispersion shows the present compositions to be at least as stable as those obtained with the commercial combinations of the prior art which contain only the polysorbate component alone as the sole dispersing agent in each case. On the other hand, the use of such agents as glycerin, propylene glycol and ethyl acetate in place of the polyethylene glycol component of the present compositions tends to cause unsatisfactory results as these compositions were all found to be inferior by reason of immiscibility, poor vitamin A stability, or unsatisfactory dispersion characteristics.

In summary, therefore, the present invention provides non-aqueous stable, readily water-dispersible vitamin A fatty acid ester compositions of the type hereinbefore described. A particularly useful composition of this invention illustrating a preferred embodiment of same is one consisting essentially of 3–10% vitamin A palmitate, 15–40% of a polyethylene glycol having an average molecular weight of about 200 up to about 600 and from about 50% to about 82% of a polyoxyethylene derivative of a monoester of sorbitan with a higher fatty acid having from 16 to 18 carbon atoms, the ratio of said polyoxyethylene derivative to said lower polyethylene glycol being from about 4:3 up to about 6:1.

This invention is still further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

A stable, readily water-dispersible vitamin A fatty acid ester composition was prepared by blending together the following ingredients in the proportions by weight specified below:

Pure vitamin A palmitate _____ 10
Polysorbate 80 (polyoxyethylene sorbitan mono-oleate) _____ 60
Polyethylene glycol 400 (polyoxyethylene glycol of average molecular weight 400) _____ 30

This was accomplished by first blending the polysorbate 80 and polyethylene glycol 400 together with stirring until thorough blending of the mixture had been achieved (as indicated by the clarity of solution), followed by the addition of the vitamin A palmitate component to the thusly blended mixture. The final preparation was then thoroughly mixed until a clear, uniform composition was again atained. This solution assayed for 172,000 U.S.P. units of vitamin A per gram and after standing for three weeks at 45° C., it retained 94% of its activity (162,000 u./g.). A similarly prepared batch of rapidly-dispersible vitamin A showed no loss in potency (171,000 u./g.) after storage for twelve weeks at 37° C.; while a similarly prepared batch after 26 weeks at room temperature, showed a potency of 152,000 u./g.

As a test of its rapid dispersibility characteristics, one ml. of the above composition was added to 19 ml. of distilled water at 20–25° C. with constant agitation being maintained throughout this step (this was provided by means of a Teflon-coated magnetic stiring bar in a 25 ml. beaker, wherein the rheostat regulating said stirring bar was set to give a slow, constant stirring action). The time in seconds required for the sample to disperse was observed and compared to that afforded by a solution of the same concentration of vitamin A palmitate in polysorbate 80 alone. In this manner, it was found that whereas the vitamin A-polysorbate 80-polyethylene glycol 400 (1:6:3) composition of this invention dispersed fully in average time of 5.8 seconds, based on an average of eight individual determinations, to give a clear solution, the vitamin A-polysorbate 80 combination (1:9) of the prior art required 472 seconds, based on an average of two determinations.

This product also proved to be completely superior in soft gelatin capsules when compared to the controls, particularly with respect to such matters as tackiness, clarity and sealing properties. It also showed no loss in potency after three weeks at 45° C.

*Example II*

The procedure described in Example I was followed to prepare a stable, readily water-dispersible vitamin A fatty acid ester composition having the exact same ingredients in the proportions by weight previously specified. One ml. of this composition was then introduced into 200 ml. of distilled water at 20–25° C. under the same conditions as described in the previous example for the preparation of a 5% solution. The procedure was then repeated using the vitamin A palmitate-polysorbate 80 combination (1:9) of the prior art. In this particular case, it was found that whereas the present composition dispersed in four seconds to give a clear solution, the vitamin A-polysorbate 80 combination of the prior art now required 263 seconds.

*Example III*

The procedure described in Example I was used to prepare other vitamin A palmitate-polysorbate 80-polyethylene glycol 400 combinations wherein the weight ratios of these three ingredients were varied, as shown in the table below, from that employed in the first example. The results obtained in this manner as regards dispersion times are recorded below in the following table where the concentration of vitamin A is kept constant at 170,000 u./g. and the value obtained with polysorbate alone is included for comparison purposes:

| Vitamin A Palmitate | Polysorbate 80 | Polyethylene Glycol 400 | Dispersion Time in Seconds |
| --- | --- | --- | --- |
| 10 | 90 |  | 437 |
| 10 | 75 | 15 | 8 |
| 10 | 70 | 20 | 8 |
| 10 | 65 | 25 | 7 |
| 10 | 57.5 | 32.5 | 9 |
| 10 | 55 | 35 | 9 |

In connection with the above, it should be noted that between the ratios of 10:50:40 and 10:55:35, respectively, a clear uniform mixture cannot be obtained as separation of the same into two phases was first encountered at ratio values below that of the latter figure.

Example IV

The procedure described in Example I was followed in preparing various other stable, readily water-dispersible vitamin A fatty acid ester compositions wherein the type polysorbate and the type polyethylene glycol employed varied from that of the first example. In this way, the following rapidly-dispersible vitamin A combinations, each having a potency of approximately 170,000 u./g., were prepared using a pure vitamin A palmitate of minimum potency 1,700,000 u./g. as the appropriate starting material in each case. As in the previous examples, the values expressed below represent the actual weight ratios of the ingredients employed herein:

| Vitamin A Palmitate | Polysorbates | | | Polyethylene Glycols | | | | Dispersion Time in Seconds |
|---|---|---|---|---|---|---|---|---|
| | 40 | 60 | 80 | 200 | 300 | 400 | 600 | |
| 10 | 60 | | | 30 | | | | 9 |
| 10 | 60 | | | | 30 | | | 9 |
| 10 | 60 | | | | | 30 | | 18 |
| 10 | 60 | | | | | | 30 | 9 |
| 10 | | 60 | | 30 | | | | 10 |
| 10 | | 60 | | | 30 | | | 15 |
| 10 | | 60 | | | | 30 | | 16 |
| 10 | | 60 | | | | | 30 | 11 |
| 10 | | | 60 | 30 | | | | 10 |
| 10 | | | 60 | | 30 | | | 12 |
| 10 | | | 60 | | | | 30 | 9 |

Other polysorbates and polyethylene glycols employed were unsatisfactory from a physical point of view, i.e., either opaque or separating mixtures were obtained.

Example V

The procedure of Example I was followed to prepare other stable, readily-dispersible vitamin A fatty acid ester compositions wherein the concentration of the vitamin A palmitate varied from 3% to 20% by weight of the total. These compositions together with their corresponding dispersion times are listed below as follows:

| Vitamin A Palmitate | Polysorbate 80 | Polyethylene Glycol 400 | Dispersion Time in Seconds |
|---|---|---|---|
| 3.0 | 85.0 | 12.0 | 11 |
| 3.0 | 60.0 | 37.0 | 8 |
| 3.0 | 55.0 | 42.0 | 10 |
| 6.0 | 85.0 | 9.0 | 17 |
| 6.0 | 80.0 | 14.0 | 7 |
| 6.0 | 60.0 | 34.0 | 4 |
| 10.5 | 73.7 | 15.8 | 15 |
| 11.0 | 72.5 | 16.5 | 9 |
| 11.8 | 70.6 | 17.6 | 7 |
| 12.0 | 70.0 | 18.0 | 11 |
| 13.0 | 66.5 | 20.5 | 8 |
| 13.3 | 66.7 | 20.0 | 7 |
| 15.0 | 65.0 | 20.0 | 45 |
| 20.0 | 60.0 | 20.0 | (*) |

*Composition did not produce a clear uniform mixture.

Example VI

The procedure described in Example I was repeated using vitamin A corn oil esters (not fat-free) in place of vitamin A palmitate as the starting material of choice, i.e., as the vitamin source. In this particular case, the potency of the vitamin A corn oil esters was approximately 650,000 u./g. The results obtained in this manner are shown below in the following table where the value obtained with polysorbate alone is also included for comparison purposes:

| Vitamin A Corn Oil Esters | Polysorbate 80 | Polyethylene Glycol 400 | Dispersion Time in Seconds |
|---|---|---|---|
| 10 | 90 | | 240 |
| 10 | 60 | 30 | 12 |
| 20 | 55 | 25 | 13 |
| 22 | 55 | 23 | 13 |

As indicated above, a satisfactory product with a potency value of up to about 130,000 µ/g. can be obtained.

Example VII

The procedure described in Example I was repeated using preisomerized forms of vitamin A palmitate in place of regular (all-trans.) vitamin A palmitate as the starting material of choice, i.e., as the vitamin source. Preisomerized forms of vitamin A palmitate, such as VAPAD (Vitamin A Palmitate for Aqueous Dispersion, Pfizer), 1000 A. (1,000,000 µ/g.) and 1500 A. (1,500,000 µ/g.) are important sources of the vitamin for use in aqueous multivitamin products to prevent the isomerization loss which normally occurs with regular vitamin A palmitate in these products. The results obtained in preparing rapidly dispersible compositions with these preisomerized forms of vitamin A palmitate are shown below in the following table:

| | Polysorbate 80 | Polyethylene Glycol 400 | Dispersion Time in Seconds |
|---|---|---|---|
| VAPAD 1000 A.: | | | |
| 10.0 | 70.0 | 20.0 | 18 |
| 10.0 | 60.0 | 30.0 | 12 |
| 12.5 | 75.0 | 12.5 | 48 |
| VAPAD 1500 A.: | | | |
| 6.7 | 60.0 | 33.3 | 16 |
| 10.0 | 60.0 | 30.0 | 9 |
| 10.0 | 70.0 | 20.0 | 16 |
| 13.3 | 70.0 | 16.7 | 16 |

As indicated above, satisfactory rapidly-dispersible compositions having potency values of up to between 125,000 µ/g. and 160,000 µ/g. of Vitamin A can be obtained with VAPAD 1000 A., while similar type compositions having potencies between 200,000 u./g. and 250,000 u./g. can be obtained with VAPAD 1500 A.

Example VIII

A dispersing composition is prepared by blending together 40 g. of polysorbate 80 and 30 g. of polyylene glycol 400, and 90 g. of polysorbate 80 and 10 g. a clear solution is attained. In like manner, solutions containing 20 g. of polysorbate 80 and 10 g. of polyethylene glycol 400, 50 g. of polysorbate 80 and 10 g. of polyethylene glycol 400, and 90 g. of polysorbate 80 and 10 g. of polyethylene glycol 400 are are each similarly prepared.

Example IX

The procedure described in Example VIII is repeated employing, in place of polysorbate 80, polysorbate 60 and, on another occasion, polysorbate 40. In like manner, the procedure is repeated successively employing polyethylene glycol 200 and then polyethylene glycol 600 in place of the polyethylene glycol 400 on an individual basis.

Example X

A solution containing 1.3 g. of vitamin A palmitate, 13.0 g. of polysorbate 80 and 6.0 g. of polyethylene glycol 300 was prepared in the same manner as that described in Example I for the vitamin A-polysorbate 80-polyethylene glycol 400 combination reported therein. The clear solution so obtained was found to be completely dispersible in water, where it gave a clear emulsion that remained unchanged when subjected to mild refrigeration, i.e., it failed to become either cloudy or milky, remaining both clear and fluid instead.

Example XI

A solution containing 7.5 g. of vitamin A palmitate, 67.5 g. of polysorbate 80 and 25 g. of polyethylene glycol 400 is prepared in exactly the same manner as that described in Example I for the vitamin composition reported therein. In this particular case, the resulting clear solution is also completely dispersible in water, where it gives a clear emulsion that fails to become either cloudy or milky in appearance even when subjected to mildly refrigerated conditions.

Example XII

A solution containing 6 g. of vitamin A palmitate, 69 g. of polysorbate 80 and 25 g. of polyethylene glycol 400 is prepared in exactly the same manner as that described in Example I for the vitamin composition reported therein. In this particular case, the resulting clear solution is also completely dispersible in water, where it gives a clear emulsion that fails to become either cloudy or milky in appearance even when subjected to mildly refrigerated conditions.

Example XIII

A solution containing 6.7 g. of vitamin A palmitate, 68.3 g. of polysorbate 80 and 25 g. of polyethylene glycol 400 is prepared in exactly the same manner as that described in Example I for the vitamin composition reported therein. In this particular case, the resulting clear solution is also completely dispersible in water, where it gives a clear emulsion that fails to become either cloudy or milky in appearance even when subjected to mildly refrigerated conditions.

Example XIV

A solution containing 7 g. of vitamin A palmitate, 66 g. of polysorbate 80 and 27 g. of polyethylene glycol 400 is prepared in exactly the same manner as that described in Example I for the vitamin composition reported therein. In this particular case, the resulting clear solution is also completely dispersible in water, where it gives a clear emulsion that fails to become either cloudy or milky in appearance even when subjected to mildly refrigerated conditions.

Example XV

A solution containing 8 g. of vitamin A palmitate, 62 g. of polysorbate 80 and 30 g. of polyethylene glycol 400 is prepared in exactly the same manner as that described in Example I for the vitamin composition reported therein. In this particular case, the resulting clear solution is also completely dispersible in water, where it gives a clear emulsion that fails to become either cloudy or milky in appearance even when subjected to mildly refrigerated conditions.

What is claimed is:

1. A non-aqueous stable, readily water-dispersible vitamin A fatty acid ester composition, comprising in combination with a vitamin A higher fatty acid ester and as dispersing agent therefor, a mixture of (1) a polyoxyethylene derivative of a monoester of sorbitan with a higher fatty acid having from 16 to 18 carbon atoms and (2) a lower polyethylene glycol having an average molecular weight that is in the range of from about 200 up to about 600, said vitamin A ester being present in said composition at a level ranging from about 3% to about 15% by weight of the total and the ratio by weight of (1) to (2) being from about 4:3 up to about 9:1 when said vitamin A concentration is below 10% and from about 4:3 to about 5:1 when said vitamin A concentration is at least about 10%.

2. A composition as claimed in claim 1 wherein the weight ratio of the sorbitan component (1) to the lower polyethylene glycol component (2) is about 2:1.

3. A composition as claimed in claim 1 wherein the vitamin A fatty acid ester is vitamin A palmitate.

4. A composition as claimed in claim 1 wherein the monoester of sorbitan is sorbitan monooleate and the polyethylene glycol has an average molecular weight of about 400.

5. A composition as claimed in claim 4 wherein the vitamin A fatty acid ester is vitamin A palmitate and the weight ratio of the polyoxyethylene sorbitan monooleate component to the polyethylene glycol of average molecular weight 400 is about 2:1.

6. A composition as claimed in claim 5 wherein the vitamin A palmitate is about 10% by weight of the total.

7. A non-aqueous stable vitamin A composition consisting essentially of 3–10% vitamin A palmitate, 15–40% of a polyethylene glycol having an average molecular weight of about 200 up to about 600 and from about 50% to about 82% of a polyoxyethylene derivative of a monoester of sorbitan with a higher fatty acid having from 16 to 18 carbon atoms, the ratio of said polyoxyethylene derivative to said lower polyethylene glycoal being from about 4:3 up to about 6:1.

8. A non-aqueous stable vitamin A composition consisting essentially of about 7.5% vitamin A palmitate, 25% of a polyethylene glycol having an average molecular weight of about 400 and about 67.5% of a polyoxyethylene derivative of sorbitan monooleate.

9. A non-aqueous stable vitamin A composition consisting essentially of 6–8% vitamin A palmitate, 25–30% of a polyethylene glycol having an average molecular weight of about 400 and from about 62% to about 69% of a polyoxyethylene derivative of sorbitan monooleate.

References Cited

UNITED STATES PATENTS

| | | | |
|---|---|---|---|
| 2,583,576 | 1/1952 | Kern | 167—81 |
| 2,907,696 | 10/1959 | Stieg et al. | 167—81 |
| 3,244,595 | 4/1966 | Feigh | 167—81 |

FOREIGN PATENTS 500,789  3/1954  Canada.

OTHER REFERENCES

Bryce et al.: The Pharmaceutical Journal, vol. 183, pp. 311–314, Nov. 14, 1959.

LEWIS GOTTS, *Primary Examiner.*

ELBERT L. ROBERTS, *Examiner.*

R. HUFF, *Assistant Examiner.*